US006176201B1

(12) United States Patent
Fields

(10) Patent No.: US 6,176,201 B1
(45) Date of Patent: Jan. 23, 2001

(54) VENTILATED CAT LITTER BOX

(76) Inventor: Dale Fields, 618 Onstead St., Morgan City, LA (US) 70380

(*) Notice: Under 35 U.S.C. 154(b), the term of this patent shall be extended for 0 days.

(21) Appl. No.: 09/397,254

(22) Filed: Sep. 16, 1999

(51) Int. Cl.[7] .................................................. A01K 1/035
(52) U.S. Cl. ........................................... 119/165; 119/163
(58) Field of Search .................................... 119/165, 161, 119/163, 166

(56) References Cited

U.S. PATENT DOCUMENTS

| D. 331,649 | 12/1992 | Saja . | |
|---|---|---|---|
| D. 350,422 | 9/1994 | Foster, Sr. . | |
| 5,044,325 | 9/1991 | Miksitz . | |
| 5,134,972 | 8/1992 | Compagnucci . | |
| 5,361,725 | * 11/1994 | Baillie et al. ........................ | 119/165 |
| 5,511,513 | 4/1996 | Baron et al. . | |
| 5,564,364 | * 10/1996 | Kovacs et al. ....................... | 119/163 |
| 5,655,478 | 8/1997 | Kiera . | |
| 5,738,040 | * 4/1998 | Simmons ............................. | 119/165 |
| 6,055,935 | * 5/2000 | Engel .................................. | 119/170 |

* cited by examiner

Primary Examiner—Peter M. Poon
Assistant Examiner—Yvonne R. Abbott

(57) ABSTRACT

A ventilated cat litter box for ventilating cat litter and simultaneously keeping the surrounding area litter free. The ventilated cat litter box includes a box, which is generally rectangular in shape. The box has a top portion, a bottom portion, a middle portion, a first wall, a second wall, a third wall, and a fourth wall. A screen covers the bottom portion of the box and is parallel to the bottom portion. A container, rectangular in shape, is located within the box upon the screen. An arched doorway is located in the first wall. A rectangular cavity is located in the top portion of the box. An electric fan is mounted in the inside of the box and is adjacent to the cavity. An actuating device is operationally coupled to the electric fan. A power source is operatively coupled to the actuating device. A ventilation port is attached to the cavity whereby the port extends upwardly away from the box. An exhaust tube has a first end and a second end. The first end is removably connected to the ventilation port.

19 Claims, 5 Drawing Sheets

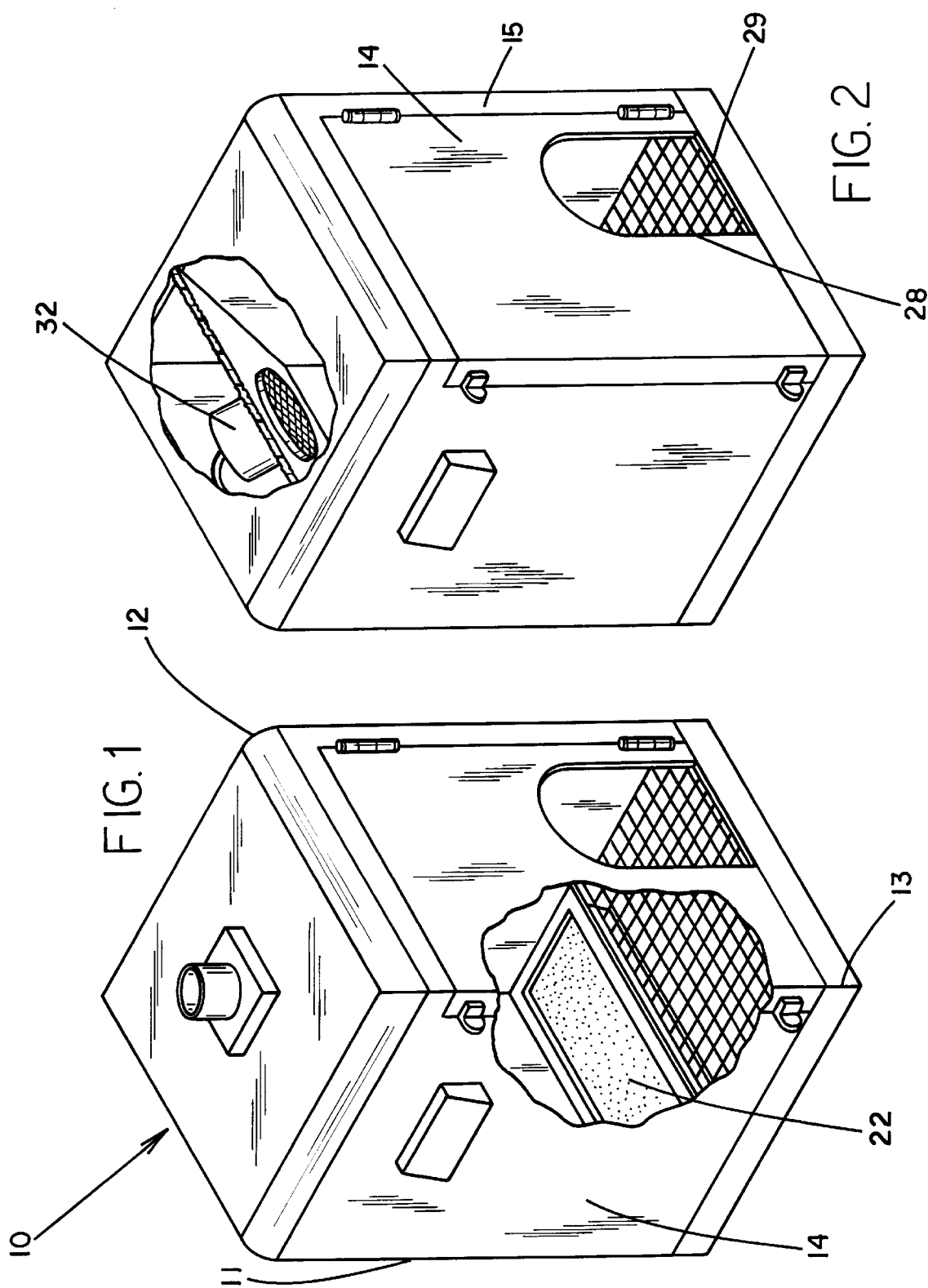

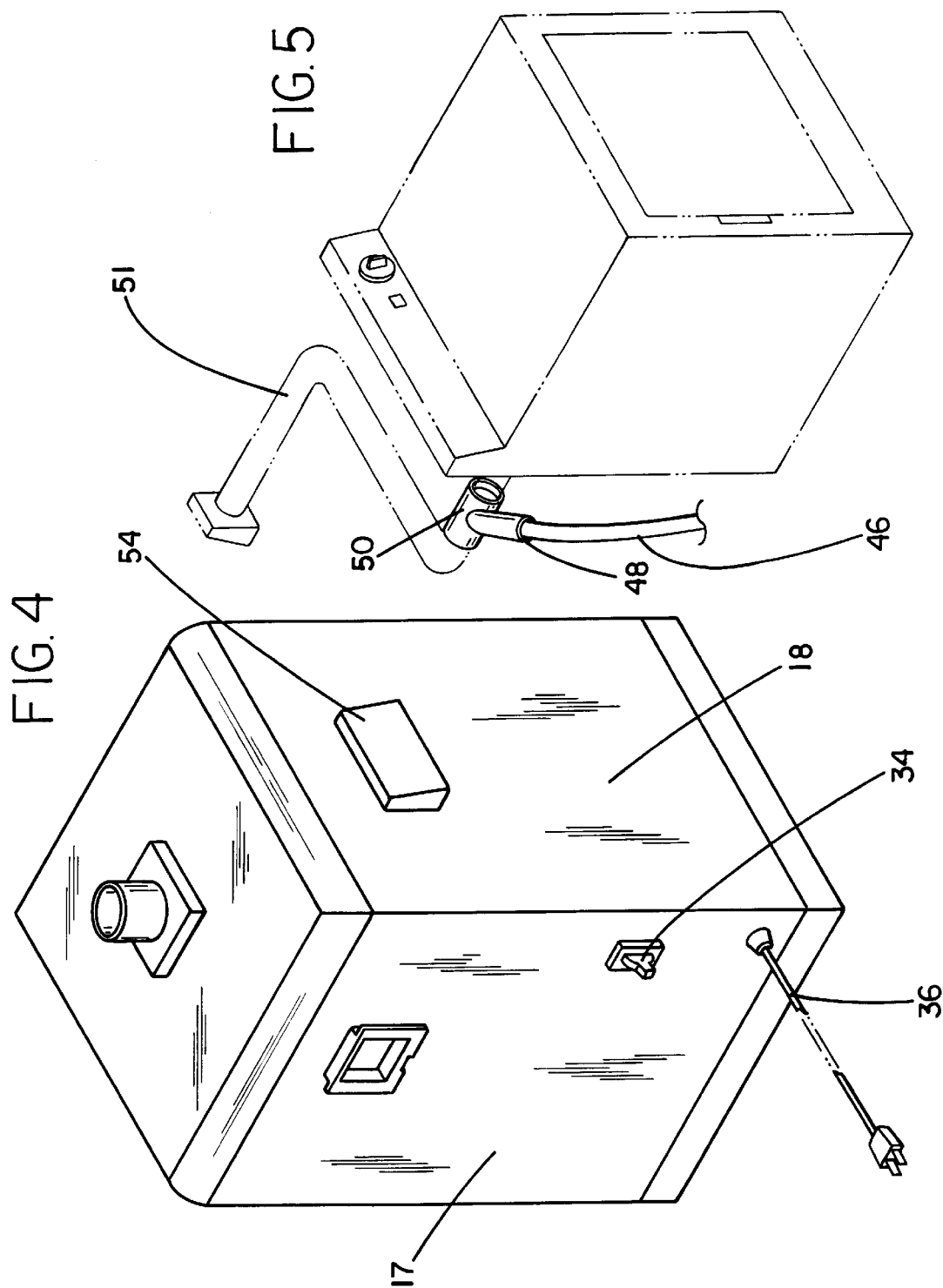

VENTILATED CAT LITTER BOX

BACKGROUND OF THE INVENTION

1. Field of the Invention

The present invention relates to ventilated litter boxes and more particularly pertains to a new ventilated cat litter box for ventilating cat litter and simultaneously keeping the surrounding area litter free.

2. Description of the Prior Art

The use of ventilated litter boxes is known in the prior art. More specifically, ventilated litter boxes heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,655,478; 5,134,972; U.S. Pat. No. Des. 331,649; U.S. Pat. Nos. 5,044,325; 5,511,513; and U.S. Pat. No. Des. 350,422.

While these devices fulfill their respective, particular objectives and requirements, the aforementioned patents do not disclose a new ventilated cat litter box. The inventive device includes a box, which is generally rectangular in shape. The box has a top portion, a bottom portion, a middle portion, a first wall, a second wall, a third wall, and a fourth wall. A screen covers the bottom portion of the box and is parallel to the bottom portion. A container, rectangular in shape, is located within the box upon the screen. An arched doorway is located in the first wall. A rectangular cavity is located in the top portion of the box. An electric fan is mounted in the inside of the box and is adjacent to the cavity. An actuating means is operationally coupled to the electric fan. A power source is operatively coupled to the actuating means. A ventilation port is attached to the cavity whereby the port extends upwardly away from the box. An exhaust tube has a first end and a second end. The first end is removably connected to the ventilation port.

In these respects, the ventilated cat litter box according to the present invention substantially departs from the conventional concepts and designs of the prior art, and in so doing provides an apparatus primarily developed for the purpose of ventilating cat litter and simultaneously keeping the surrounding area litter free.

SUMMARY OF THE INVENTION

In view of the foregoing disadvantages inherent in the known types of ventilated litter boxes now present in the prior art, the present invention provides a new ventilated cat litter box construction wherein the same can be utilized for ventilating cat litter and simultaneously keeping the surrounding area litter free.

The general purpose of the present invention, which will be described subsequently in greater detail, is to provide a new ventilated cat litter box apparatus and method which has many of the advantages of the ventilated litter boxes mentioned heretofore and many novel features that result in a new ventilated cat litter box which is not anticipated, rendered obvious, suggested, or even implied by any of the prior art ventilated litter boxes, either alone or in any combination thereof.

To attain this, the present invention generally comprises a box, which is generally rectangular in shape. The box has a top portion, a bottom portion, a middle portion, a first wall, a second wall, a third wall, and a fourth wall. A screen covers the bottom portion of the box and is parallel to the bottom portion. A container, rectangular in shape, is located within the box upon the screen. An arched doorway is located in the first wall. A rectangular cavity is located in the top portion of the box. An electric fan is mounted in the inside of the box and is adjacent to the cavity. An actuating means is operationally coupled to the electric fan. A power source is operatively coupled to the actuating means. A ventilation port is attached to the cavity whereby the port extends upwardly away from the box. An exhaust tube has a first end and a second end. The first end is removably connected to the ventilation port.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new ventilated cat litter box apparatus and method which has many of the advantages of the ventilated litter boxes mentioned heretofore and many novel features that result in a new ventilated cat litter box which is not anticipated, rendered obvious, suggested, or even implied by any of the prior art ventilated litter boxes, either alone or in any combination thereof.

It is another object of the present invention to provide a new ventilated cat litter box which may be easily and efficiently manufactured and marketed.

It is a further object of the present invention to provide a new ventilated cat litter box which is of a durable and reliable construction.

An even further object of the present invention is to provide a new ventilated cat litter box which is susceptible of a low cost of manufacture with regard to both materials and labor, and which accordingly is then susceptible of low prices of sale to the consuming public, thereby making such ventilated cat litter box economically available to the buying public.

Still yet another object of the present invention is to provide a new ventilated cat litter box which provides in the apparatuses and methods of the prior art some of the advantages thereof, while simultaneously overcoming some of the disadvantages normally associated therewith.

Still another object of the present invention is to provide a new ventilated cat litter box for ventilating cat litter and simultaneously keeping the surrounding area litter free. When the cat steps upon the screen, the litter on its feet from the litter container falls through the screen and into a tray. The litter is thus not carried out of the box.

Yet another object of the present invention is to provide a new ventilated cat litter box which includes a box, which is generally rectangular in shape. The box has a top portion, a bottom portion, a middle portion, a first wall, a second wall, a third wall, and a fourth wall. A screen covers the bottom portion of the box and is parallel to the bottom portion. A container, rectangular in shape, is located within the box upon the screen. An arched doorway is located in the first wall. A rectangular cavity is located in the top portion of the box. An electric fan is mounted in the inside of the box and is adjacent to the cavity. An actuating means is operationally coupled to the electric fan. A power source is operatively coupled to the actuating means. A ventilation port is attached to the cavity whereby the port extends upwardly away from the box. An exhaust tube has a first end and a second end. The first end is removably connected to the ventilation port.

Still yet another object of the present invention is to provide a new ventilated cat litter box that is capable of using solar power.

Even still another object of the present invention is to provide a new ventilated cat litter box that has a lid attachment for areas which have no exhaust outlet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new ventilated cat litter box according to the present invention.

FIG. 2 is a schematic perspective view of a new ventilated cat litter box the present invention.

FIG. 4 is a schematic perspective rear view of the present invention.

FIG. 5 is a schematic perspective view of the exhaust tube of the present invention.

DESCRIPTION OF THE PREFERRED EMBODIMENT

Figure 3:
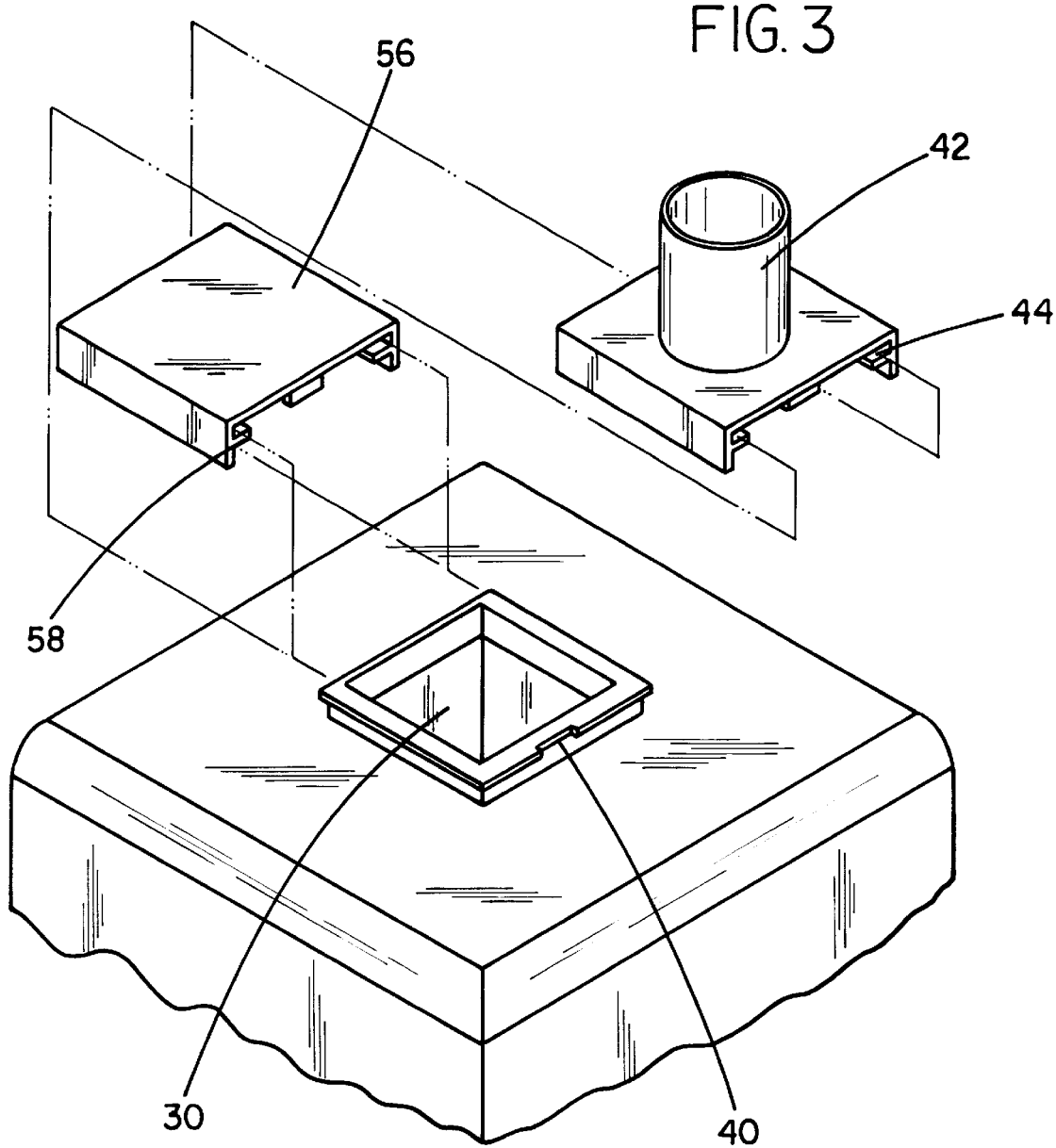
FIG. 3 is a schematic perspective view of the ventilation cavity of the present invention.
Figure 6:
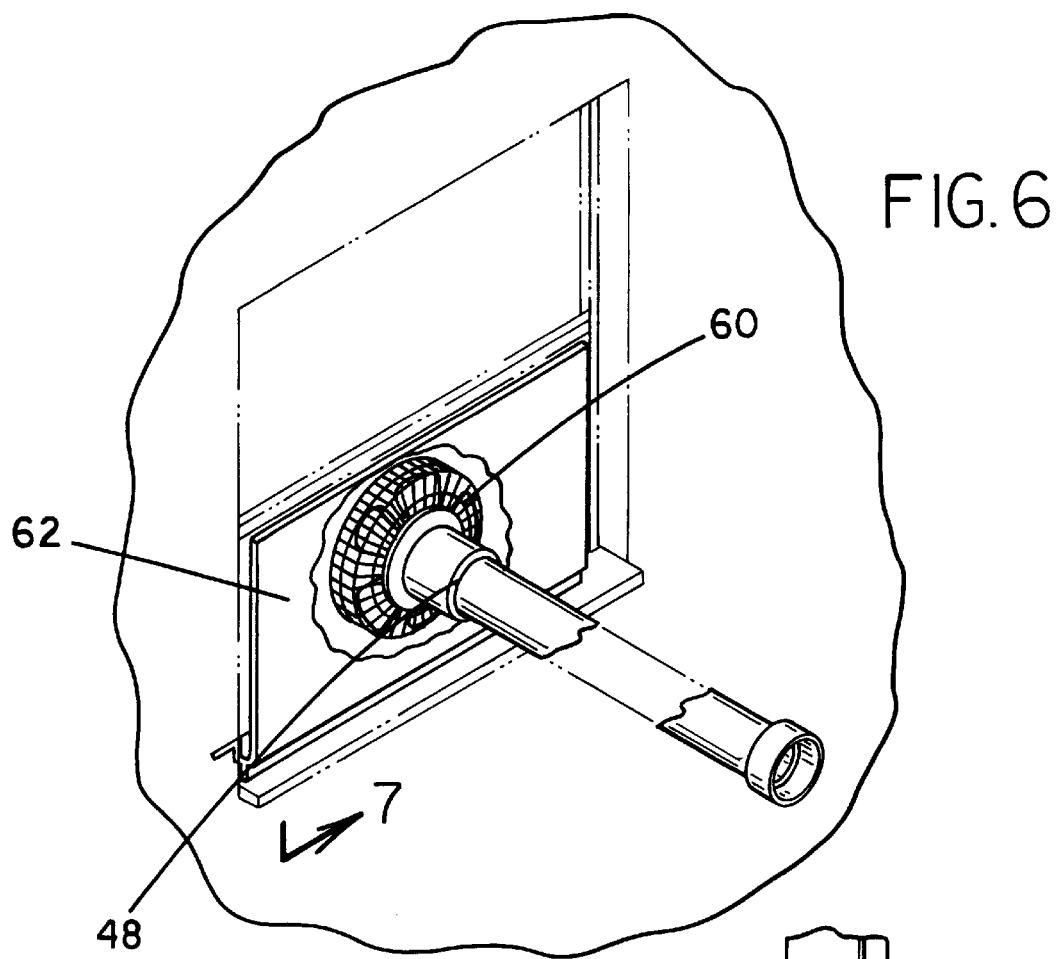
FIG. 6 is a schematic perspective view of the solar cell power source of the present invention.
Figure 7:
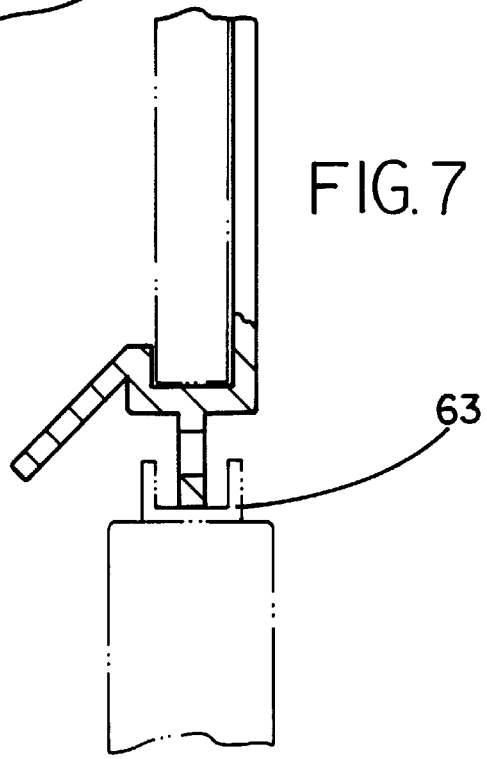
FIG. 7 is a schematic cross-sectional view taken along line 7—7 of the present invention.
Figure 9:
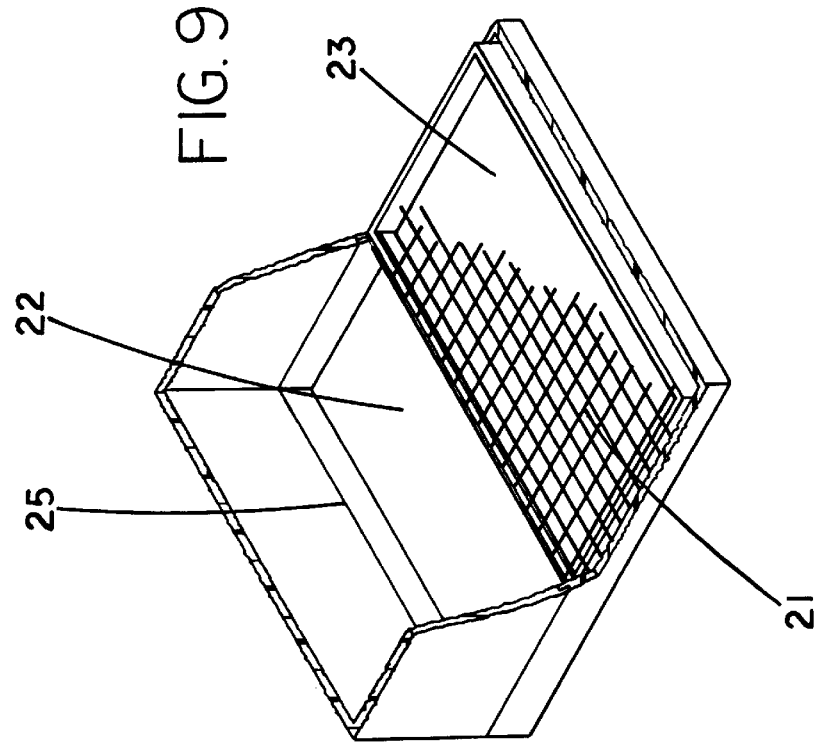
FIG. 9 is a schematic cut-away perspective view of the bottom portion of the present invention.
Figure 8:
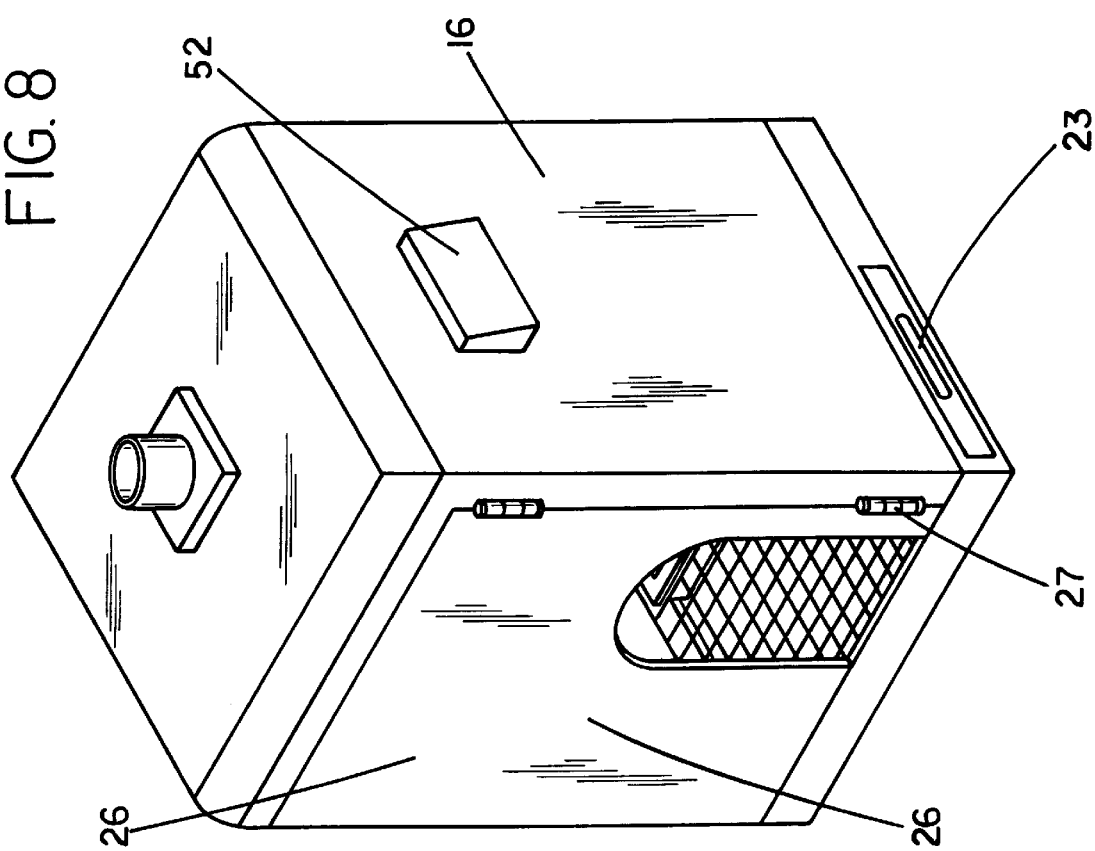
FIG. 8 is a schematic perspective view of the present invention.

With reference now to the drawings, and in particular to FIGS. 1 through 9 thereof, a new ventilated cat litter box embodying the principles and concepts of the present invention and generally designated by the reference numeral 10 will be described.

As best illustrated in FIGS. 1 through 9, the ventilated cat litter box 10 generally comprises a box 11. The box is generally rectangular in shape, the box has a top portion 12, a bottom portion 13, a middle portion 14, a first wall 15, a second wall 16, a third wall 17, and a fourth wall 18, the box has an inside and an outside.

A screen 21 covers the bottom portion of the box and is parallel to the bottom portion.

A tray 23 is mounted slidably in the lower portion of the box. The tray preferably extends from the second wall to the fourth wall. The tray is located below the screen.

A rectangular container 22, preferably having a length substantially the same as a length of the box and a width about one-half a width of the box, is located within the box upon the screen wherein an elongate portion 25 of the container is adjacent to the third wall 17 of the box.

In the preferred embodiment, a door 26 is attached to the first wall by a hinge means 27. The door is preferably of such a size that it substantially forms the first wall.

Preferably, an arched doorway 28 is in the door. The doorway has a base 29 adjacent to the screen. The doorway forms the opening, or entrance to the box. Should the embodiment not contain a door, the doorway may be cut from the first wall itself (not shown).

A rectangular cavity 30 cuts through the top portion. Preferably the cavity is located in the center or middle of the top portion.

An electric fan 32 is mounted in the inside of the box adjacent to the cavity.

In the preferred embodiment, a motion detector (not shown) is located within the box. The motion detector is located adjacent to the doorway, and is operatively coupled to the electric fan 32. The motion detector is adapted to turn on the electric fan.

An actuating means 34 is operationally coupled to the motion detector. Preferably, the actuating means extends outwardly from the third wall.

Also preferably, a timer (not shown) is operatively coupled to the electric fan and is adapted to turn off the electric fan. The timer is generally set for about 10 minutes.

A power source 36 is operatively coupled to the motion detector.

A first connecting means 40 is fixedly attached to the cavity on the outside of the box. A ventilation port 42 is fixedly attached to a second connecting means 44. The first connecting means is removably connected to the second connecting means wherein the port extends upwardly away from the box.

A first exhaust tube 46 has a first end (not shown) and a second end 48. The first end is removably connected to the port.

Preferably, a hollow connector tube 50, shaped like the letter "T" is adapted to connect the second end of the first exhaust tube to a second exhaust tube 51. This allows for use of the same exhaust exit from the house. The hollow connector will have exhaust flaps therein to prevent air from traveling toward the box.

Preferably, two handles are on the box. The first handle 52 is located on the second wall of the outside of the box, and the second handle 54 is located on the fourth wall of the outside of the box. Each of the handles is located in the middle portion 14 of the box.

Preferably, the invention comes with a lid 56 with a second connector 58 means adapted for attachment to the first connector means so that the cavity can be covered when the ventilating system is not being used.

In another embodiment, the an electric fan 60 is mounted to the second end of the exhaust tube 48. The fan is mounted within a solar power means such as photovoltaic cells or solar panels 62. The panels are mounted in a window frame 63. The solar power means are a power source for said electric fan. In this embodiment the electric fan is adapted to receive AC and DC power from an outlet as well for those times when sunlight is not available. In still another embodiment, the ventilation port is fixedly attached to the top portion.

In use, the container 22 is filled with litter. The box is plugged in and the switch 34 is turned to the on position to actibate the motion detector. The cat, upon entering the box to use the litter, hits the motion detector which starts the fan 32. When the cat leaves the box, it must travel over the screen. The screen allows litter on the cat's foot to fall off of the cat and enter the tray 23. This keeps the area around the litter box clean. The tray can be removed by sliding it out and dumping the excess litter out. When the litter needs to be changed, the door 26 opens for easy access. The fan draws the air from outside of the box and pushes it out of the ventilation port 42 until it is outside. The timer lets the fan run for about 10 minutes to conserve energy. A second embodiment conserves energy by utilizing solar power. This invention can be used near any window, as the solar cells 62 are adapted to fit within a window frame 63.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal litter box comprising:
a box, said box being generally rectangular in shape, said box having a top portion, a bottom portion, a middle portion, a first wall, a second wall, a third wall, and a fourth wall, said box having an inside and an outside;
a screen, said screen covering said bottom portion of said box, said screen being parallel to said bottom portion;
a container, said container being rectangular in shape, said container being located within said box upon said screen;
an arched doorway, said doorway being in said first wall, said doorway having a base, said base being adjacent to said screen, said doorway forming the entrance to said box;
a rectangular cavity, said cavity being through said top portion of said box;
an electric fan, said fan being mounted in said inside of said box, said fan being adjacent to said cavity;
an actuating means wherein said actuating means is operationally coupled to said electric fan;
a power source, said power source being operatively coupled to said actuating means;
a ventilation port, said port being fixedly attached to said cavity forming an extension thereof wherein said port extends upwardly away from said box;
an exhaust tube, said exhaust tube having a first end and a second end, said first end being removably connected to said port.

2. An animal litter box as stated in claim 1 further comprising:
a tray, said tray being slidably located in said lower portion of said box, said tray being located below said screen.

3. An animal litter box as stated in claim 1 further comprising said container having a length substantially the same as a length of said box, said container having a width about one-half a width of said box, said container being located such that an elongate portion of said container is adjacent to said third wall of said box.

4. An animal litter box as stated in claim 1 further comprising a door, said door being attached to said first wall by a hinge means wherein said door substantially forms said first wall and whereby said doorway is located within said door.

5. An animal litter box as stated in claim 1 further comprising a motion detector, said motion detector being located within said box, said motion detector being located adjacent to said doorway, said motion detector being operatively coupled to said electric fan and said power supply, said motion detector adapted to turn on said electric fan.

6. An animal litter box as stated in claim 5 further comprising a timer, said timer being operatively coupled to said electric fan, said timer adapted to turn off said electric fan.

7. An animal litter box as stated in claim 1 further comprising a hollow connector tube, said connector tube being adapted to connect said second end of said first exhaust tube to a second exhaust tube.

8. An animal litter box as stated in claim 1 wherein said power source being solar power.

9. An animal litter box comprising:
a box, said box being generally rectangular in shape, said box having a top portion, a bottom portion, a middle portion, a first wall, a second wall, a third wall, and a fourth wall, said box having an inside and an outside;
a screen, said screen covering said bottom portion of said box, said screen being parallel to said bottom portion;
a container, said container being rectangular in shape, said container being located within said box upon said screen;
an arched doorway, said doorway being in said first wall door, said doorway having a base, said base being adjacent to said screen, said doorway forming the entrance to said box;

a rectangular cavity, said cavity being through said top portion of said box;

a first connecting means being fixedly attached to said cavity wherein said first connecting means is on the outside of said box;

a ventilation port, said port being fixedly attached to a second connecting means, said first connecting means being removably connected to said second connecting means wherein said port extends upwardly away from said box;

an exhaust tube, said exhaust tube having a first end and a second end, said first end being removably connected to said port;

an electric fan, said fan being mounted to said second end of said exhaust tube, said fan being mounted within a solar power means, said solar power means being a power source for said electric fan;

an actuating means wherein said actuating means is operationally coupled to said electric fan.

10. An animal litter box as stated in claim 9 further comprising:

a tray, said tray being slidably located in said lower portion of said box, said tray being located below said screen.

11. An animal litter box as stated in claim 9 further comprising said container having a length substantially the same as a length of said box, said container having a width about one-half a width of said box, said container being located such that an elongate portion of said container is adjacent to said third wall of said box.

12. An animal litter box as stated in claim 9 further comprising a door, said door being attached to said first wall by a hinge means wherein said door substantially forms said first wall and whereby said doorway is located within said door.

13. An animal litter box as stated in claim 9 further comprising a motion detector, said motion detector being located within said box, said motion detector being located adjacent to said doorway, said motion detector being operatively coupled to said electric fan and said power supply, said motion detector adapted to turn on said electric fan.

14. An animal litter box as stated in claim 13 further comprising a timer, said timer being operatively coupled to said electric fan, said timer adapted to turn off said electric fan.

15. An animal litter box as stated in claim 9 wherein said electric fan is adapted for AC and DC power.

16. An animal litter box as stated in claim 9 further comprising a lid, said lid having a second coupling means adapted to be removably attached to said first connecting means.

17. An animal litter box comprising:

a box, said box being generally rectangular in shape, said box having a top portion, a bottom portion, a middle portion, a first wall, a second wall, a third wall, and a fourth wall, said box having an inside and an outside;

a screen, said screen covering said bottom portion of said box, said screen being parallel to said bottom portion;

a tray, said tray being slidably housed in said lower portion of said box, said tray being located below said screen;

a container, said container being rectangular in shape, said container having a length substantially the same as a length of said box, said container having a width about one-half a width of said box, said container being located within said box upon said screen wherein an elongate portion of said container is adjacent to said third wall of said box;

a door, said door being attached to said first wall by a hinge means wherein said door substantially forms said first wall;

an arched doorway, said doorway being in said door, said doorway having a base, said base being adjacent to said screen, said doorway forming the entrance to said box;

a rectangular cavity, said cavity being through said top portion, said cavity being located substantially in a middle of said top portion;

an electric fan, said fan being mounted in said inside of said box, said fan being adjacent to said cavity;

a motion detector, said motion detector being located within said box, said motion detector being located adjacent to said doorway, said motion detector being operatively coupled to said electric fan, said motion detector adapted to turn on said electric fan;

an actuating means wherein said actuating means is operationally coupled to said motion detector, said actuating means extending outwardly from said third wall;

a timer, said timer being operatively coupled to said electric fan, said timer adapted to turn off said electric fan;

a power source, said power source being operatively coupled to said motion detector;

a first connecting means being fixedly attached to said cavity wherein said first connecting means is on the outside of said box;

a ventilation port, said port being fixedly attached to a second connecting means, said first connecting means being removably connected to said second connecting means wherein said port extends upwardly away from said box;

a first exhaust tube, said first exhaust tube having a first end and a second end, said first end being removably connected to said port;

a hollow connector tube, said connector tube being adapted to connect said second end of said first exhaust tube to a second exhaust tube;

two handles, one of said handles being located on said second wall of said outside of said box, a second of said handles being located on said fourth wall of said outside of said box, each of said handles being located in said middle portion of said box.

18. An animal litter box as stated in claim 17 further comprising a lid, said lid having a second coupling means adapted to be removably attached to said first connecting means.

19. An animal litter box as stated in claim 17 further comprising said power source being solar power.

* * * * *